United States Patent
Mitchell et al.

(10) Patent No.: US 7,366,121 B1
(45) Date of Patent: Apr. 29, 2008

(54) METHOD AND SYSTEM FOR REDUCING DATA OVERHEAD IN A WIRELESS SYSTEM

(75) Inventors: Michael Mitchell, Park City, UT (US); Daniel G. Watt, West Jordan, UT (US); Carmen Brokke, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 1052 days.

(21) Appl. No.: 10/402,234

(22) Filed: Mar. 27, 2003

Related U.S. Application Data

(60) Provisional application No. 60/375,097, filed on Apr. 22, 2002.

(51) Int. Cl.
*H04B 7/00* (2006.01)
(52) U.S. Cl. ............................. 370/310.1; 370/395.1
(58) Field of Classification Search ............... None
See application file for complete search history.

(56) References Cited

U.S. PATENT DOCUMENTS

| | | | |
|---|---|---|---|
| 5,414,701 A * | 5/1995 | Shtayer et al. ........... 370/395.3 |
| 5,717,689 A * | 2/1998 | Ayanoglu ................... 370/349 |
| 6,034,958 A * | 3/2000 | Wicklund ............... 370/395.32 |
| 6,289,014 B1 * | 9/2001 | Hoshino et al. ............ 370/392 |
| 6,327,261 B1 * | 12/2001 | Makoua et al. ............. 370/392 |
| 6,556,570 B1 * | 4/2003 | Delattre et al. ........ 370/395.31 |
| 6,594,237 B1 * | 7/2003 | Kiuchi et al. ............... 370/250 |
| 6,760,345 B1 * | 7/2004 | Rosengard ................... 370/477 |
| 6,917,616 B1 * | 7/2005 | Normand et al. ......... 370/395.1 |
| 6,920,142 B1 * | 7/2005 | Hodgins et al. ............ 370/397 |
| 6,963,570 B1 * | 11/2005 | Agarwal ................ 370/395.32 |
| 7,095,745 B2 * | 8/2006 | Tomizawa ................... 370/397 |
| 7,154,895 B1 * | 12/2006 | Bornemisza et al. ..... 370/395.1 |

FOREIGN PATENT DOCUMENTS

WO WO 9904522 * 1/1999

* cited by examiner

*Primary Examiner*—Anh-Vu H. Ly
(74) *Attorney, Agent, or Firm*—Harrington & Smith, PC

(57) ABSTRACT

A method and system for compressing an asynchronous transfer mode (ATM) header suitable for wireless ATM systems is provided. The ATM Virtual Path Identifier (VPI) and Virtual Channel Identifier (VCI) are replaced with four and eight bit pointers, respectively. In addition, Generic Flow Control (GFC) and Header Error Control (HEC) fields are removed.

23 Claims, 6 Drawing Sheets

| FIG.2A |
| FIG.2B |

METHOD AND SYSTEM FOR REDUCING DATA OVERHEAD IN A WIRELESS SYSTEM

CLAIM OF PRIORITY FROM A COPENDING PROVISIONAL PATENT APPLICATION

This patent application claims priority from U.S. Provisional Patent Application No. 60/375,097, filed 22 Apr. 2002, incorporated by reference herein in its entirety.

FIELD OF THE INVENTION

This invention relates to wireless communications systems and, more particularly, to wireless data communication systems that use asynchronous transfer mode (ATM) data packets.

BACKGROUND OF THE INVENTION

An ATM switch receives an ATM cell (i.e., packet) across a link with a known virtual channel identifier (VCI), or virtual path identifier (VPI) value. The ATM switch looks up a connection value in a local translation table to determine the outgoing port (or ports) of the connection, as well as the new VPI/VCI value of the connection on that link. The ATM switch then retransmits the cell on that outgoing link with the new connection identifiers (VPI/VCI values). An ATM signaling process is used to set up the local translation tables prior to the transmittal of any data. The ATM signaling is initiated by an ATM node that desires to set up a connection through an ATM network. The signaling is then routed through the ATM network, from ATM switch to ATM switch, setting up the connection identifiers (VPI/VCI) as it goes, until it reaches the destination (end) ATM node. The end node can either accept and confirm the connection request, or it can reject it and clear the connection. In general, the ATM is a cell switching technology that uses fixed-size cells (53 bytes).

However, in bandwidth-constrained ATM links, such as those encountered using wireless (i.e., RF) ATM links, it is desirable to provide a method and system that allows ATM cell traffic, but with a reduced number of bits in order to conserve bandwidth.

SUMMARY OF THE INVENTION

A method is disclosed for compressing an ATM header having a virtual path identifier (VPI) and a virtual channel identifier (VCI). The method includes storing a plurality of VPIs, and associating a unique ATM 4-bit VPI pointer with each of the plurality of stored VPIs. The method also includes storing a plurality of 16-bit VCIs, and associating a unique ATM 8-bit VCI pointer with each of the plurality of stored VCIs. The method then determines the unique ATM 4-bit VPI pointer associated with a VPI stored in an ATM header VPI location, and determines the unique ATM 8-bit VCI pointer associated with a VCI stored in the ATM header VCI location, and uses these determined values for processing the ATM header.

This invention also provides a two byte asynchronous transfer mode (ATM) header structure suitable for wireless ATM communication systems. The two data bytes include a 12-bit virtual path identifier (VPI) and virtual channel identifier (VCI), a 3-bit payload type identifier (PTI); and a 1-bit cell loss priority (CLP).

A method is disclosed for reducing transmission overhead over wireless links. The method includes providing an ATM cell having an ATM header and then compressing the ATM header. The ATM cell with the compressed ATM header is then transmitted, such as over a wireless link, to an end destination, where, upon receiving the ATM cell with the compressed ATM header, the header is decompressed.

In a further embodiment this invention provides a system for reducing overhead in a wireless data communications system that employs ATM cells. The system includes a first memory for storing a plurality of VPIs, where each of the plurality of VPIs is associated with a corresponding unique first memory storage address. The system also includes a second memory for storing a plurality of VCIs, where each of the plurality of VCIs is associated with a corresponding unique second memory storage address. The system further includes an address translation unit (ATU) for receiving and translating an ATM header, according to the corresponding unique memory storage addresses. The ATU operates to clear the VPI and VCI fields and to store the unique first and second memory addresses in the least significant bits of the respective VPI and VCI fields. The system includes a framer device for truncating the VPI and VCI field bit locations, removing a header error correction (HEC) field and/or a Generic Flow Control (GFC) Field. The system also includes a receiver for decompressing the compressed ATM header.

BRIEF DESCRIPTION OF THE DRAWINGS

The foregoing aspects and other features of this invention are explained in the following description, intended to be read in conjunction with the accompanying drawings, wherein.

DETAILED DESCRIPTION OF THE PREFERRED EMBODIMENTS

Figure 1:
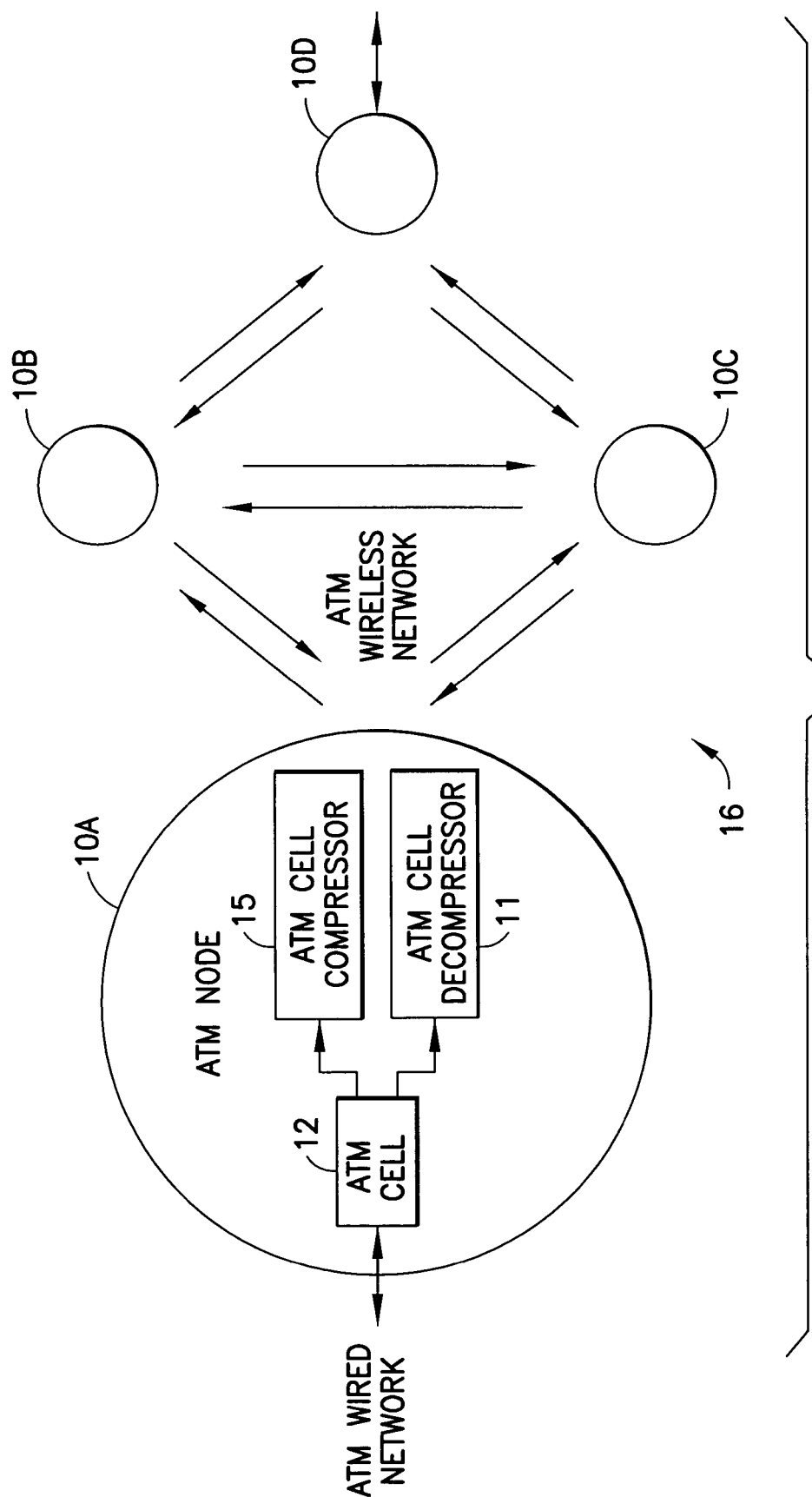
FIG. 1 represents an Asynchronous Transfer Mode (ATM) network diagram incorporating features of the present invention.

Referring to FIG. 1, there is shown a network diagram of a network 16 having nodes 10A, 10B, 10C, and 10D; with an expanded view of ATM node 10A that incorporates aspects of this invention. Although this invention will be described with reference to the embodiments shown in the drawings, it should be understood that this invention can be embodied in many alternate forms and embodiments. For example, while four ATM network nodes 10 are shown in FIG. 1, it will be appreciated that any suitable of nodes may be used.

Referring to FIG. 1, an ATM network node 10A includes an ATM Cell Decompressor 11 that produces an ATM cell 12, and an ATM Cell Compressor 15. The input/output of ATM wireless network node 10A can be provided to other ATM wireless network nodes either directly or indirectly, such as the ATM wireless network nodes 10B, 10C and 10D.

Figure 2A:
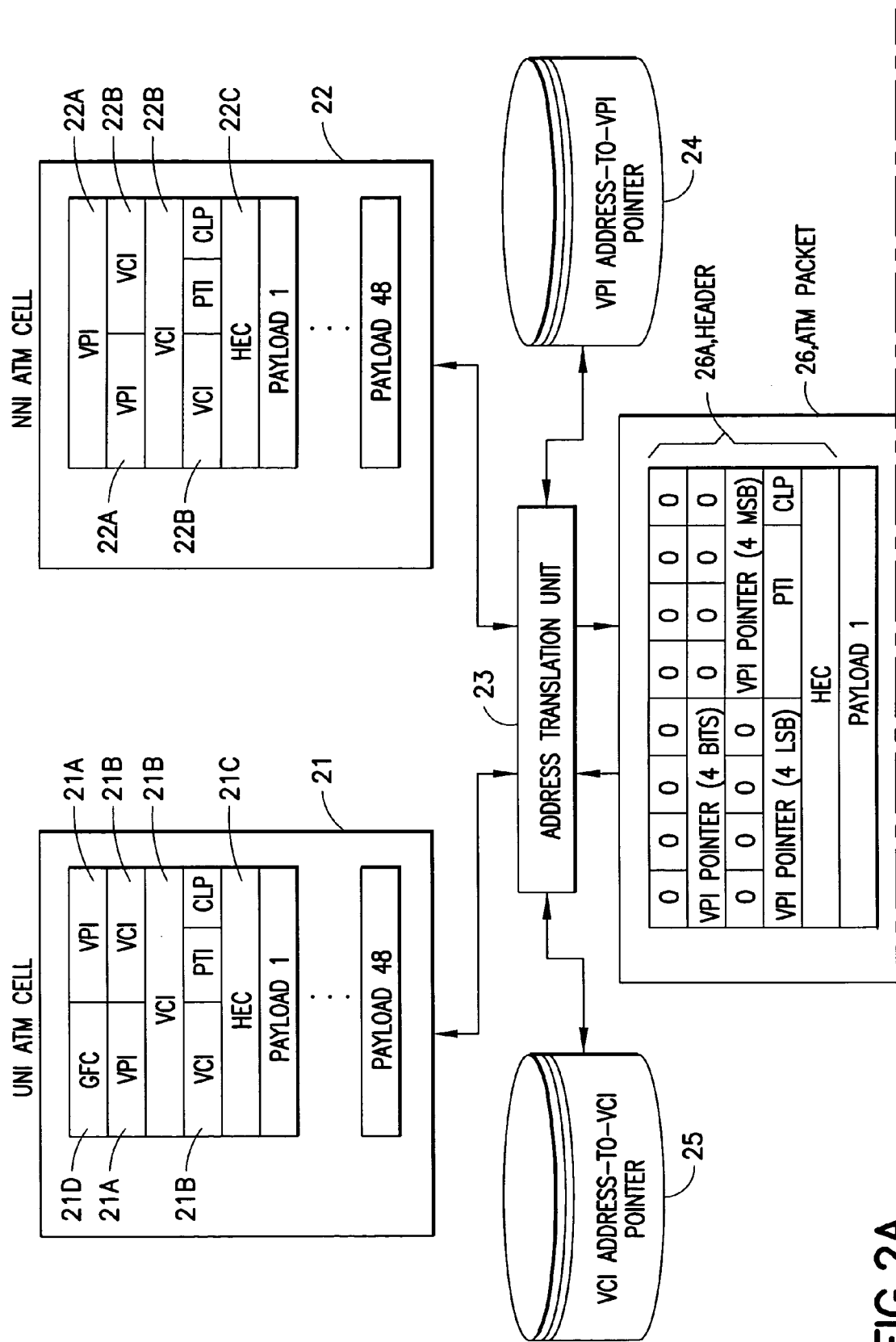
FIG. 2 is a flow diagram showing ATM header compression and decompression in accordance with features of the present invention shown in FIG. 1.
Figures 2, 2B:
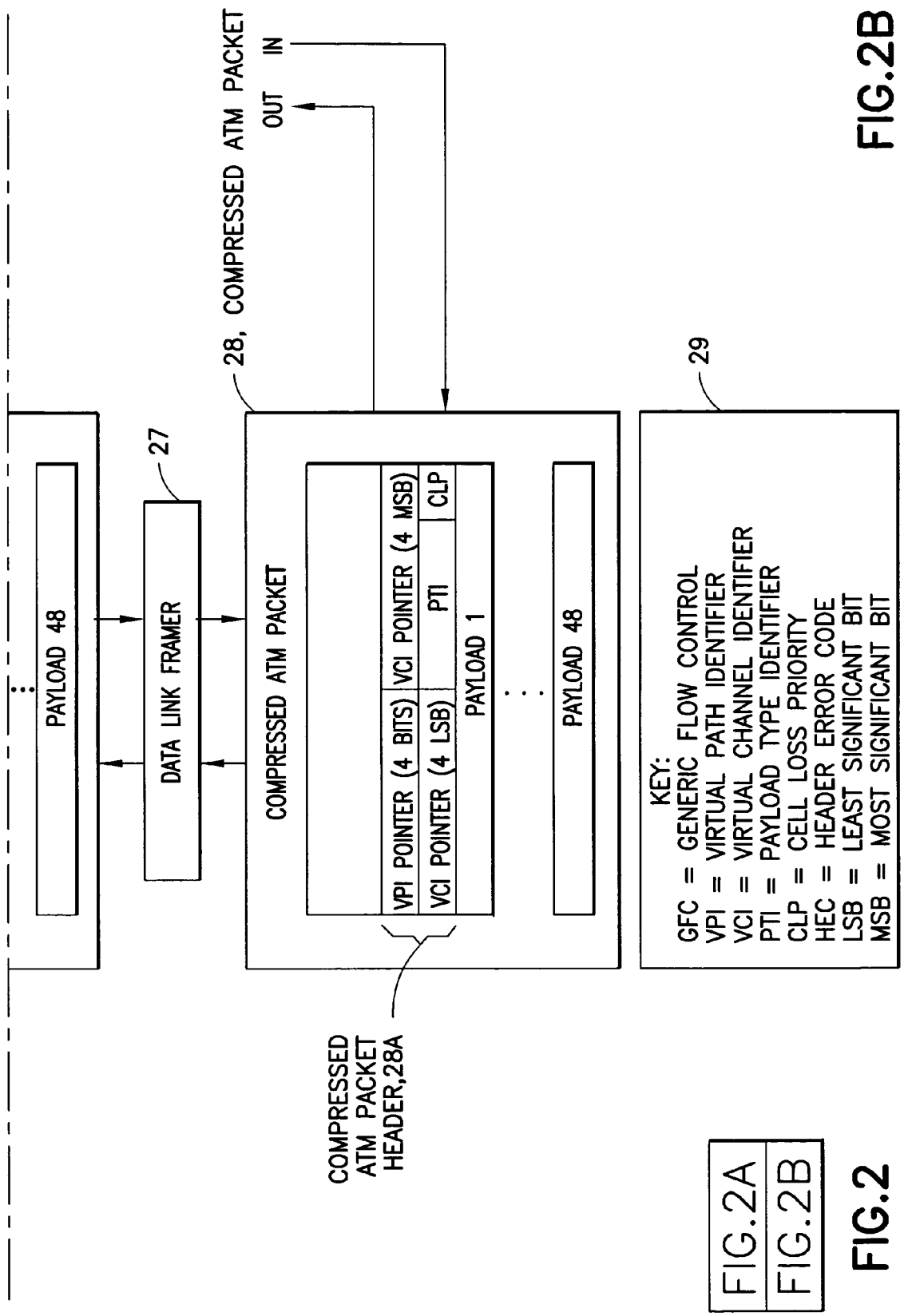
Figure 3:
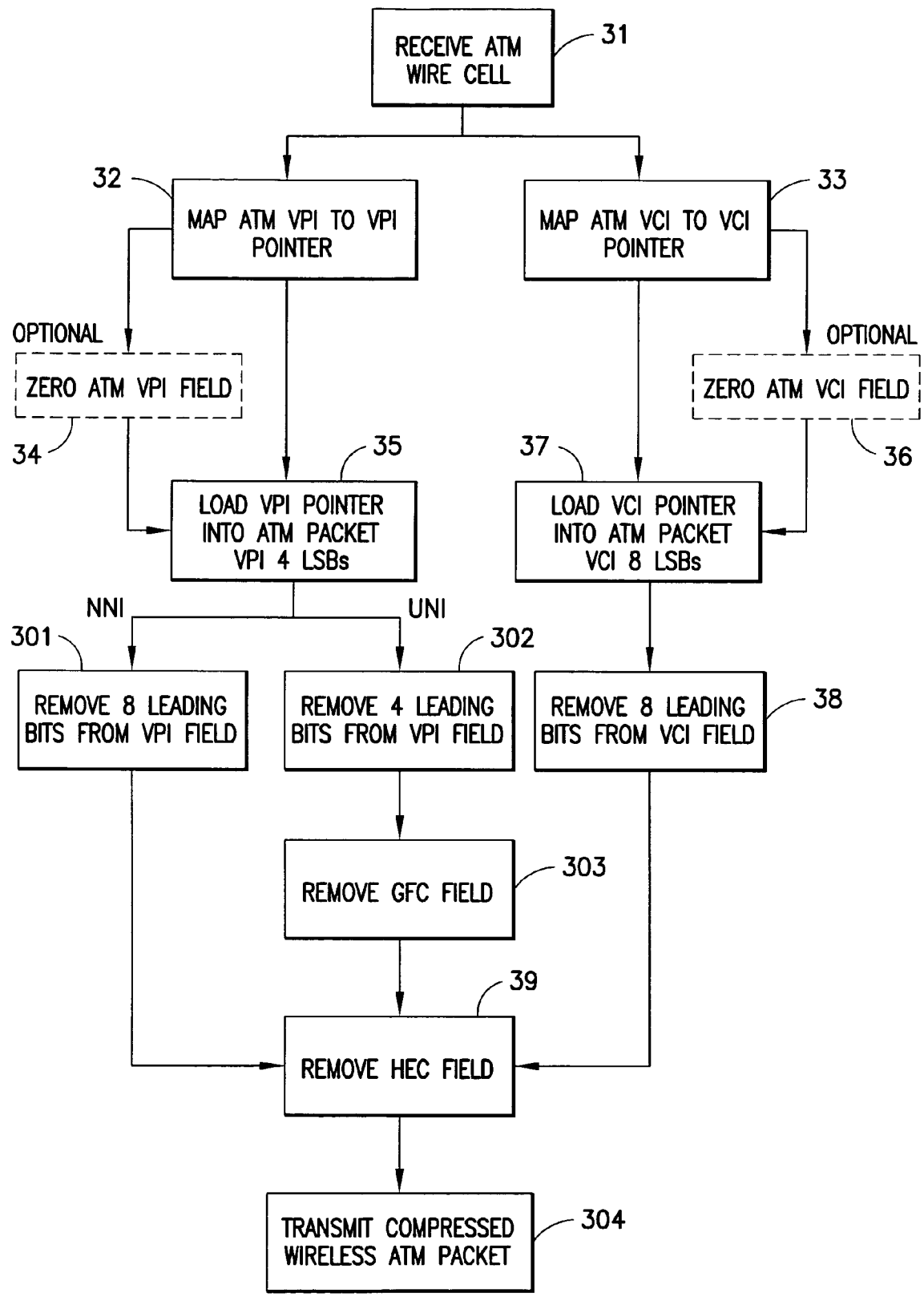
FIG. 3 is a method flow chart of one embodiment of the compression features shown in FIG. 2.

Referring now to FIGS. 2 and 3, features of the ATM Cell Compressor 15 are described. FIG. 2 shows a block diagram of the compression of either a user-network-interface (UNI) ATM cell 21 or a network-network-interface (NNI) ATM cell 22. NNI and UNI ATM cells are well known and need not be discussed here. Referring as well to the logic flow diagram of FIG. 3, an Address Translation Unit (ATU) 23 receives, step 31, the ATM cell 21 or 22, reads the value in the VPI field 21A, 22A, and maps, step 32, the value to a VPI Address-to-VPI Pointer in memory 24. The ATU 23 also reads the value in the VCI field 21B, 22B and maps, step 33, the value to a VCI Address-to-VCI Pointer stored in memory 25. Steps 35 and 37 load the 4-bit VPI Pointer and the 8-bit VCI Pointer values into the ATM header 26A. In alternate embodiments, the ATU 23 may zero the VPI and VCI fields of the ATM header 26A, prior to loading the VPI and VCI pointers, steps 34 and 36, respectively. A Data Link Framer 27 removes the eight leading bits from the VPI field if the cell is a NNI ATM cell, or removes four leading bits if the cell is an UNI ATM Cell, steps 301, and 302, respectively; leaving the 4-bit VPI Pointer in the remainder of the VPI field. In addition, the Data Link Framer 27 removes eight leading bits from the VCI field; leaving the 8-bit VCI pointer in the remainder of the VCI field. It will be appreciated that in this embodiment the number of possible VCI/VPI pointer combinations is 4096. In alternate embodiments a suitable number of VCI/VPI pointer combinations may be selected by changing the bit lengths of the VCI and VPI pointers. The Data Link Framer 27 also removes the HEC field 21C, 22C and, in a UNI ATM cell, the GFC field 21D, thereby creating the compressed ATM cell 28 having, in this embodiment, a two byte (16-bit) compressed ATM cell header 28A. The compressed ATM cell 28 is now in an advantageously smaller form, but with the same information payload (payload 1-48) for transmission, step 304, over a wireless ATM network, such as shown in FIG. 1.

Figure 5A:
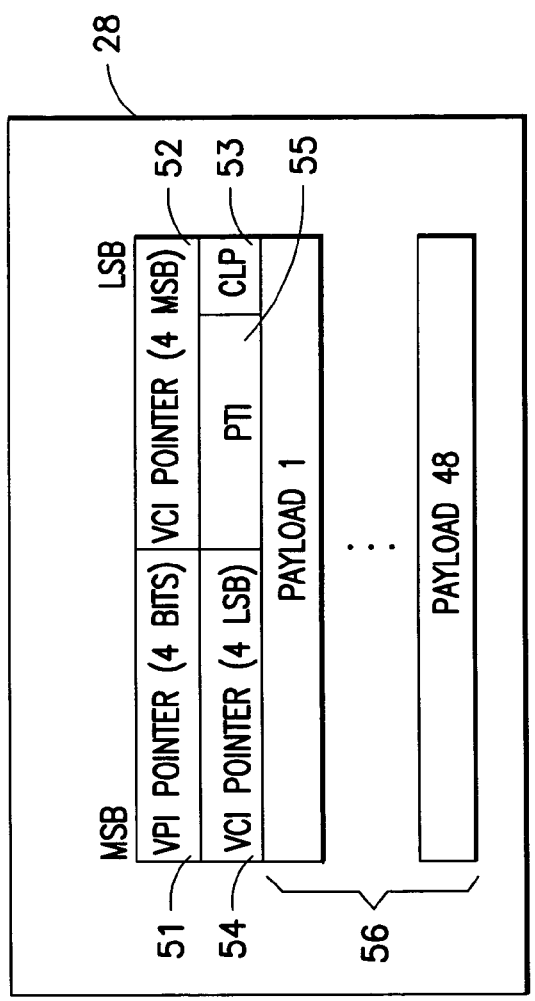
FIG. 5A is a pictorial illustration of an ATM header shown in tabular byte form and compressed in accordance with features of the present invention.
Figure 5B:
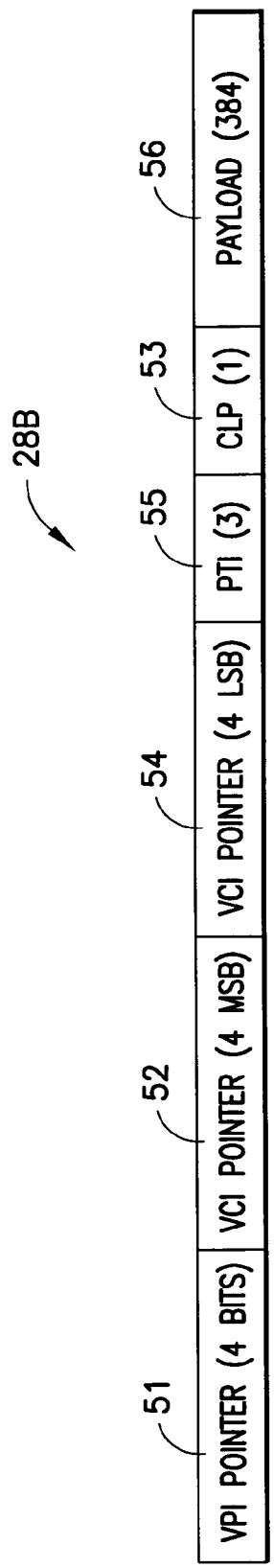
FIG. 5B is a pictorial illustration of an ATM header shown in serial bit form and compressed in accordance with features of the present invention.

Referring to FIGS. 5A and 5B there is shown the compressed ATM Cell 28 in cell form (i.e. tabular byte form) or serial form 28B, respectfully. It will be appreciated that in alternate embodiments the VPI and the VCI pointers 51 and 52, respectively, may be any suitable bit length.

It will be appreciated that removal of the HEC 21C, 22C and the GFC 21D is a feature of this invention. The HEC 21C, 22C may be removed since the higher layer ATM adaptation layers may be relied upon for error detection. For example, if a compressed ATM cell header 28A has an incorrect bit in either the VPI or VCI pointers, an incorrect VPI and/or VCI address may be selected by the ATU 23. An ATM switch, or node, (FIG. 1, item 10A) would then direct the compressed header further into the network 16, such as to node 10B rather than, for example, to the intended node 10C; or the ATM switch may forward the ATM packet directly to an end user segmentation and reassembly (SAR) device. However, in order for a misdirected cell to have appreciable negative effect on applications or network performance, the header value with errors would need to be decoded into another virtual circuit that is active within the network. To mitigate this effect certain restrictions may be placed upon the type of information flow across an interface (UNI or NNI). In a preferred embodiment the higher layer protocol is the ATM Adaptation Layer 5 (AAL-5) standard. Each AAL-5 Protocol Data Unit (PDU) (i.e., ATM packet) utilizes a 32-bit Cyclic Redundancy Check (CRC) to validate data integrity. Thus, the result of a misdirected cell on an AAL-5 PDU is a loss of CRC continuity. The receiving end station checks the CRC, and a CRC failure results in the packet being discarded. In alternate embodiments, there is a finite probability that a single cell AAL-PDU will be falsely decoded onto an active Virtual Channel (VC) connection, and delivered to an end station where the PDU passes the CRC. However, the probability of this occurring is low, and may be handled by local error handling routines.

In one embodiment, the information flowing across the AAL-5 interface includes primarily classical Internet Protocol (IP) over ATM AAL-5 packets; or in other words, a logical IP structure is mapped to the ATM network. In alternate embodiments, any suitable ATM protocol such as, for example, Interim Local Management Interface (ILMI) and UNI and NNI signaling, utilizing ATM AAL-5, may be used.

Figure 4:
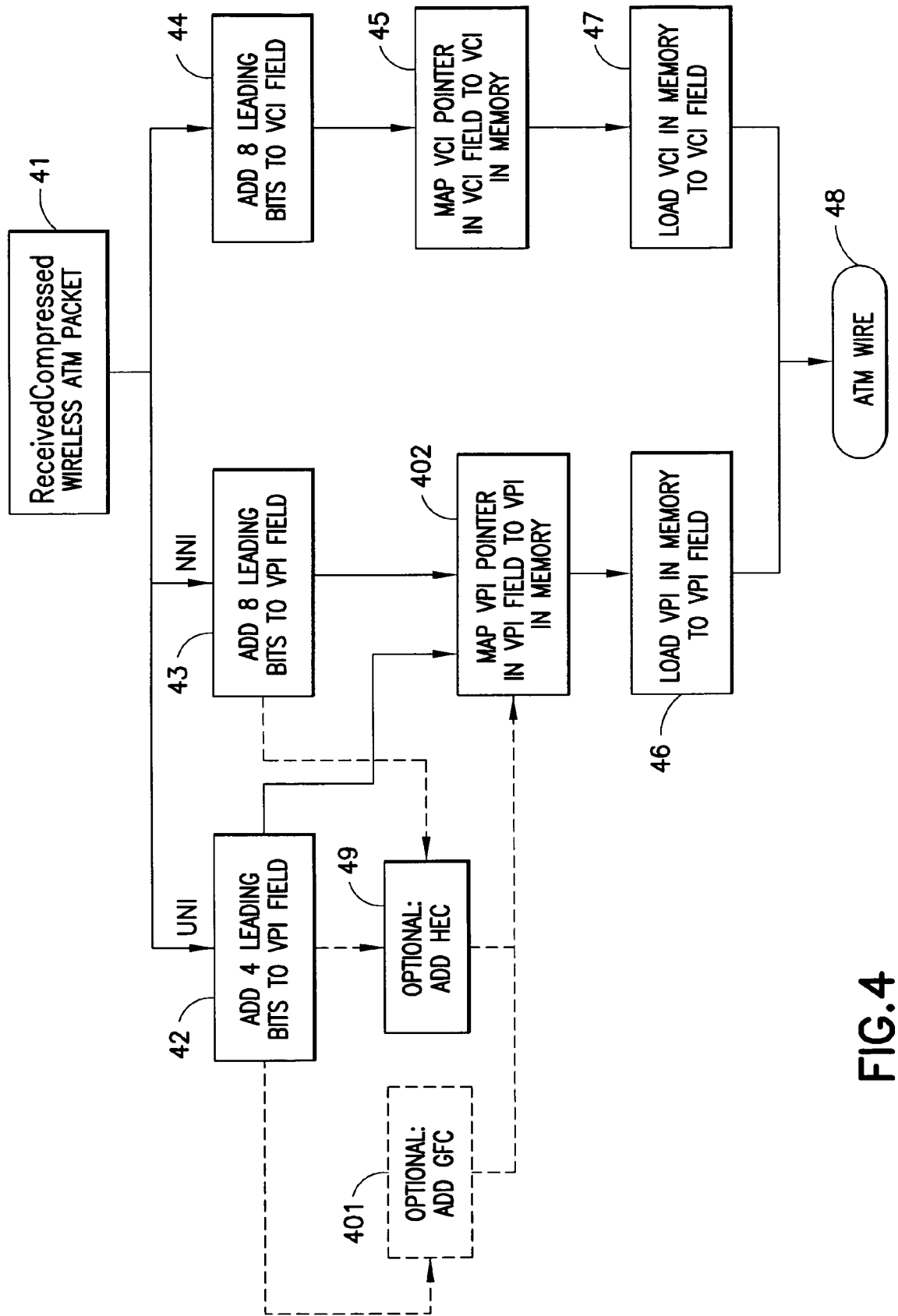
FIG. 4 is a method flow chart of one embodiment of the decompression features shown in FIG. 2.

Referring now to FIGS. 2 and 4, features of the ATM Packet Decompressor 11 (FIG. 1) are described. Step 41 receives the compressed ATM Cell 28 through the Data Link Framer 27. The Data Link Framer 27 adds, or pads, eight bits to the VCI field, step 44, and four bits to the VPI field for a UNI ATM cell, step 42, or eight bits to the VPI field, step 43 for a NNI ATM cell. In an alternate embodiment the Data Link Framer 27 may also add a HEC field, step 49, and/or a GFC field, step 401, in a UNI ATM cell. The ATU 23 reads the VPI and VCI pointer values and retrieves the corresponding VPI and VCI values from the VCI Address-to-VCI Pointer database 25, and the VPI Address-to-VPI Pointer database 24, steps 402 and 45, respectively. These values are then loaded, steps 46 and 47, into the respective ATM header fields to reproduce the standard UNI or NNI ATM cell, 21 or 22, respectively. The ATM Cell is then ready for normal ATM wire use, step 48.

It will be appreciated that compression of the ATM header from five bytes to two bytes reduces ATM overhead from 10.42% to 4.17%. The resulting throughput increase equates to approximately 6.25%, which is a significant improvement for applications that operate over a bandwidth constrained link.

Another advantage of the invention is in retaining ATM Quality of Service (QoS) across a connection through use of a fixed length ATM cell structure. This combination of ATM QoS, with reduced overhead, can be used to provide real time services across bandwidth constrained wireless links. In addition, this invention may be used as an alternative to low-overhead transmission techniques such as Simple Data Link (SDL), which cannot provide QoS guarantees.

It should be understood that the foregoing description is only illustrative of the invention. Various alternatives and modifications can be devised by those skilled in the art without departing from the invention. For example, the present invention advantageously reduces the size of the ATM header 28A from 5 bytes to 2 bytes (16 bits). However, in alternate embodiments any suitable number of reduced bytes may be used. Accordingly, the present invention is intended to embrace all such alternatives, modifications and variances which fall within the scope of the appended claims.

What is claimed is:

1. A method for compressing an asynchronous transfer mode (ATM) header, the ATM header having a virtual path identifier (VPI) location and a virtual channel identifier (VCI) location, the method comprising the steps of:

storing a plurality of VPIs, wherein storing the plurality of VPIs comprises associating a unique ATM 4-bit VPI pointer with each of the plurality of VPIs;

storing a plurality of 16-bit VCIs, wherein storing the plurality of 16-bit VCIs comprises associating a unique ATM 8-bit VCI pointer with each of the plurality of VCIs;

determining a unique ATM 4-bit VPI pointer associated with a VPI stored in an ATM header VPI location; and determining a unique ATM 8-bit VCI pointer associated with a VCI stored in an ATM header VCI location.

2. A method as in claim 1, where storing the plurality of VPIs comprises storing 8-bit VPIs.

3. A method as in claim 1, where storing the plurality of VPIs comprises storing 12-bit VPIs.

4. A method as in claim 1, where determining the unique ATM 4-bit VPI pointer further comprises clearing the VPI stored in the ATM header; storing the unique ATM 4-bit VPI pointer in the ATM header VPI location; and truncating the ATM header VPI location.

5. A method as in claim 4, where truncating the ATM header location further comprises truncating the ATM header VPI location to 4-bits.

6. A method as in claim 1, where determining the unique ATM 8-bit VCI pointer further comprises clearing the VCI stored in the ATM header, storing the unique ATM 8-bit VCI pointer in the ATM header VCI location, and truncating the ATM header VCI location.

7. A method as in claim 6, where truncating the ATM header VCI location further comprises truncating the ATM header VCI location to 8-bits.

8. A method for reducing transmission overhead over wireless links, the method comprising:

providing an asynchronous transfer mode (ATM) cell, the ATM cell having an ATM header;

compressing the ATM header;

transmitting the ATM cell with the compressed ATM header over a wireless link;

receiving the ATM cell with the compressed ATM header; and decompressing the ATM header;

where compressing the ATM header comprises: translating a first virtual path identifier (VPI) stored within the ATM header VPI location by determining a first unique index associated with the first VPI stored within the ATM header; clearing the ATM header VPI location; storing the first unique index associated with the first VPI in the ATM header VPI location; truncating the ATM header VPI location; and further comprises translating a first virtual channel identifier (VCI) stored within the ATM header VCI location, and where determining the unique index associated with the first VPI stored within the ATM header further comprises providing a second memory storage area, where the second memory storage area comprises a plurality of 8-bit VPIs; and determining a memory address associated with the first VPI stored within the ATM header corresponding to one of the plurality of 8-bit VPIs in the second memory storage area.

9. A method as in claim 8, where providing an ATM cell provides a user-network interface (UNI) ATM cell.

10. A method as in claim 8, where providing an ATM cell provides a network-network interface (NNI) ATM cell.

11. A method as in claim 8, where truncating the ATM header VPI location comprises truncating the ATM header VPI location to 4 least significant bits.

12. A method as in claim 8, where decompressing the ATM header comprises retrieving from the ATM header the first unique index associated with the first VPI; in response to retrieving the first unique index associated with the first VPI, retrieving from a fourth memory storage area a second VPI; expanding the ATM header VPI location; and storing the second VPI in the expanded ATM header VPI location.

13. A method as in 12, where expanding the ATM header VPI location further comprises expanding the ATM header VPI location to 8-bits.

14. A method as in claim 8, where decompressing the ATM header comprises retrieving from the ATM header a second unique index associated with the first VCI; in response to retrieving the second unique index associated with the first VCI, retrieving a second VCI; expanding the ATM header VCI location; and storing the second VCI in the expanded ATM header VCI location.

15. A method as in claim 14, where expanding the ATM VCI location further comprises expanding the ATM VCI location to 16-bits.

16. A method for reducing transmission overhead over wireless links, the method comprising:

providing an asynchronous transfer mode (ATM) cell, the ATM cell having an ATM header;

compressing the ATM header;

transmitting the ATM cell with the compressed ATM header over a wireless link;

receiving the ATM cell with the compressed ATM header; and decompressing the ATM header;

where compressing the ATM header comprises: translating a first virtual path identifier (VPI) stored within the ATM header VPI location by determining a first unique index associated with the first VPI stored within the ATM header; clearing the ATM header VPI location; storing the first unique index associated with the first VPI in the ATM header VPI location; truncating the ATM header VPI location; and further comprises translating a first virtual channel identifier (VCI) stored within the ATM header VCI location, and where determining the first unique index comprises providing a first memory storage area, where the first memory storage area comprises a plurality of 12-bit VPIs; and determining a memory address associated with the first VPI stored within the ATM header corresponding to one of the plurality of 12-bit VPIs in the first memory storage area.

17. A method as in claim 16, where decompressing the ATM header comprises retrieving from the ATM header the first unique index associated with the first VPI; in response to retrieving the first unique index associated with the first VPI, retrieving from a fourth memory storage area a second VPI; expanding the ATM header VPI location; and storing the second VPI in the expanded ATM header VPI location and where expanding the ATM header VPI location further comprises expanding the ATM header VPI location to 12-bits.

18. A method for reducing transmission overhead over wireless links, the method comprising:

providing an asynchronous transfer mode (ATM) cell, the ATM cell having an ATM header;

compressing the ATM header;

transmitting the ATM cell with the compressed ATM header over a wireless link;

receiving the ATM cell with the compressed ATM header; and decompressing the ATM header;

where compressing the ATM header comprises:

translating a first virtual path identifier (VPI) stored within the ATM header VPI location by determining a first unique index associated with the first VPI stored within the ATM header;

clearing the ATM header VPI location;

storing the first unique index associated with the first VPI in the ATM header VPI location; and truncating the ATM header VPI location;

and translating a first virtual channel identifier (VCI) stored within the ATM header VCI location by determining a unique second index associated with the first VCI stored within the ATM header, clearing the ATM header VCI location;

storing the unique second index associated with the first VCI in the ATM header VCI location; and truncating the ATM header VCI location;

where determining the unique second index associated with the first VCI stored within the ATM header further comprises providing a third memory storage area, where the third memory storage area comprises a plurality of 16-bit VCIs; and determining a memory address associated with the first VCI stored within the ATM header corresponding to one of the plurality of 16-bit VCIs in the third memory storage area.

19. A method as in claim 18, where truncating the ATM header VCI location comprises truncating the ATM header VCI location to 8 least significant bits.

20. A system for reducing data overhead in a wireless asynchronous transfer mode (ATM) system, the system comprising:

memory for storing a plurality of first VPIs, where each of the plurality of first VPIs is associated with a corresponding unique first memory storage address, and for storing a plurality of first VCIs, where each of the plurality of first VCIs is associated with a corresponding unique second memory storage address;

a first address translation unit (ATU) for receiving and translating a first ATM header, where the first ATM header comprises:

a virtual path identifier field (VPI);

a 16-bit virtual channel identifier (VCI) field;

a 3-bit payload type identifier (PTI) field;

a 1-bit cell loss priority (CLP) field; and where the first ATU translates a VPI in the VPI field and a VCI in the VCI field according to corresponding memory storage addresses, where the ATU further zeros the VPI and VCI fields and stores in the least significant bits of the respective VPI and VCI fields, the translated VPI and VCI;

a framer for truncating the VPI and VCI fields bit locations holding a zero, appending the VPI and VCI fields to the first ATM header, and removing a header error correction (HEC) field; and a receiver for decompressing the first ATM header.

21. A system as in claim 20, where the VPI field comprises a 12-bit VPI field.

22. A system as in claim 20, where the VPI filed comprises an 8-bit VPI field.

23. A system as in claim 20, where the receiver comprises:

receive memory for storing a plurality of second VPIs, where each of the plurality of second VPIs is associated with a corresponding unique third memory storage address, and for storing a plurality of second VCIs, where each of the plurality of second VCIs is associated with a corresponding unique fourth memory storage address;

a receive framer for receiving the first ATM header and expanding the VPI and VCI fields;

a receive ATU for translating the appended VPI field and the appended VCI field according to the corresponding VPI and VCI values in the third and fourth memory storage addresses, respectively, where the receive ATU stores the corresponding VPI and VCI values from the corresponding memory storage addresses in the appended VPI and VCI fields expanded by the receive framer, respectively.

* * * * *